United States Patent
Bonta et al.

(10) Patent No.: US 8,068,454 B2
(45) Date of Patent: Nov. 29, 2011

(54) SYSTEM FOR ENABLING MOBILE COVERAGE EXTENSION AND PEER-TO-PEER COMMUNICATIONS IN AN AD HOC NETWORK AND METHOD OF OPERATION THEREFOR

(75) Inventors: Jeffrey D. Bonta, Arlington Heights, IL (US); George Calcev, Hoffman Estates, IL (US); Benedito J. Fonseca, Jr., Glen Ellyn, IL (US); Nitin R. Mangalvedhe, Streamwood, IL (US); Nathan J. Smith, Crystal Lake, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 935 days.

(21) Appl. No.: 11/936,513

(22) Filed: Nov. 7, 2007

(65) Prior Publication Data

US 2009/0116430 A1    May 7, 2009

(51) Int. Cl.
*H04W 84/18* (2009.01)
*H04W 72/00* (2009.01)
*H04W 4/00* (2009.01)
*H04W 56/00* (2009.01)

(52) U.S. Cl. ........ 370/329; 370/338; 370/350; 455/450; 455/509

(58) Field of Classification Search ............ 370/329, 370/338, 350; 455/450, 509
See application file for complete search history.

(56) References Cited

U.S. PATENT DOCUMENTS

| | | | |
|---|---|---|---|
| 6,807,165 B2* | 10/2004 | Belcea | 370/347 |
| 6,879,574 B2* | 4/2005 | Naghian et al. | 370/338 |
| 7,272,129 B2 | 9/2007 | Calcev et al. | |
| 7,821,994 B2* | 10/2010 | Sherman et al. | 370/329 |
| 2004/0264422 A1 | 12/2004 | Calcev et al. | |
| 2005/0135286 A1 | 6/2005 | Nurminen et al. | |
| 2006/0045065 A1 | 3/2006 | Kim et al. | |
| 2006/0140135 A1 | 6/2006 | Bonta et al. | |
| 2006/0215611 A1* | 9/2006 | Nakagawa et al. | 370/332 |
| 2007/0217367 A1* | 9/2007 | Lee et al. | 370/335 |
| 2008/0316955 A1* | 12/2008 | Yu | 370/319 |
| 2009/0040985 A1* | 2/2009 | Barnawi et al. | 370/336 |
| 2009/0168662 A1* | 7/2009 | Tsuboi et al. | 370/252 |

OTHER PUBLICATIONS

PCT International Search Report Application No. PCT/US2008/080087—Dated March 25, 2009—13 pages.
Korean Patent Office—Korean Application No. 10-2010-7012359—(Translation) Office Action mailed Sep. 16, 2011.

* cited by examiner

*Primary Examiner* — Alpus H Hsu
(74) *Attorney, Agent, or Firm* — Randi L. Karpinia

(57) ABSTRACT

A method for enabling mobile coverage extension and peer-to-peer communications in an ad hoc network is provided. The method includes communicating at least one message among the plurality of nodes, wherein the at least one message comprises: an ad hoc zone, wherein the ad hoc zone comprises at least one channel selected from a group of channels comprising: at least one synchronization channel for synchronizing out of coverage nodes, at least one access channel for peer-to-peer communications, and at least one ad hoc relay data/traffic channel for exchanging data during data sessions between one or more nodes.

13 Claims, 11 Drawing Sheets

SYSTEM FOR ENABLING MOBILE COVERAGE EXTENSION AND PEER-TO-PEER COMMUNICATIONS IN AN AD HOC NETWORK AND METHOD OF OPERATION THEREFOR

FIELD OF THE DISCLOSURE

The present disclosure relates generally to wireless communication networks and more particularly to extending mobile coverage and enabling peer to peer communication in ad hoc networks.

BACKGROUND

A peer-to-peer (P2P) network allows wireless devices to directly communicate with each other. Wireless devices within range of each other can discover and communicate directly without involving central access points.

An "ad hoc network" refers to a self-configuring network of nodes connected by wireless links which form an arbitrary topology. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. One characteristic of the nodes is that each node can directly communicate over a short range with nodes which are a single "hop" away. Such nodes are sometimes referred to as "neighbor nodes." A large network can be realized using intelligent access points (IAP) which provide wireless nodes with access to a wired backhaul.

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through communication with neighboring nodes. The routing information can also be periodically broadcast in the network to reflect the current network topology. Alternatively, to reduce the amount of information transmitted for maintaining accurate routing information, the network nodes may exchange routing information only when it is needed.

Recent developments within various Institute of Electrical and Electronics Engineers (IEEE) 802 standards have considered support for the International Telecommunication Union's (ITU's) International Mobile Telecommunications (IMT) Advanced requirements. (for IEEE standards referenced herein, see, http://standards.ieee.org/getieee802/index.html or contact the IEEE at IEEE, 445 Hoes Lane, PO Box 1331, Piscataway, N.J. 08855-1331, USA)

International Mobile Telecommunications-Advanced (IMT-Advanced) is a concept from the ITU for mobile communication systems with capabilities which go further than that of the current system requirements. In the vision of the ITU, there may be a need for a new wireless access technology capable of supporting a wide range of data rates according to economic and service demands in multi-user environments with target peak data rates of up to approximately 100 Mega bits per second (Mbit/s) for high mobility such as mobile access and up to approximately 1 Giga bits per second (Gbit/s) for low mobility such as nomadic/local wireless access.

Spectrum considerations for IMT-Advanced include up to 100 Mega Hertz (MHz) of bandwidth in either licensed or unlicensed spectrum below 6 Giga Hertz (GHz). The IMT-Advanced Network Topology requirement proposes multi-hop, mesh and P2P (peer-to-peer) modes. As such, the IEEE 802.16m operational requirements call for multi-hop relay support as well as self-optimization of network performance with respect to service availability, quality of service (QoS), network efficiency and throughput.

In an ad hoc network topology supporting direct link and multi-hop mesh, several challenges exist to enable peer-to-peer (P2P) communication sessions to support use cases such as out-of-coverage range extension, in-building penetration, social networking, gaming, public safety, and short range communication for high density environments or infrastructure off-loading. These challenges include efficient resource allocations, synchronization, route discovery, and near-far interference. In a system design employing an Orthogonal Frequency Division Multiple Access (OFDMA) Physical Layer (PHY) (such as IEEE 802.16e), an additional challenge is multi-access interference resulting from synchronization errors. With the current IEEE 802.16e frame structure, it is not possible to enable in-band and out-of-band multi-hop relays for peer-to-peer communications unless these challenges are resolved.

Accordingly, there is a need for system for enabling mobile coverage extension and peer-to-peer communications in an ad hoc network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
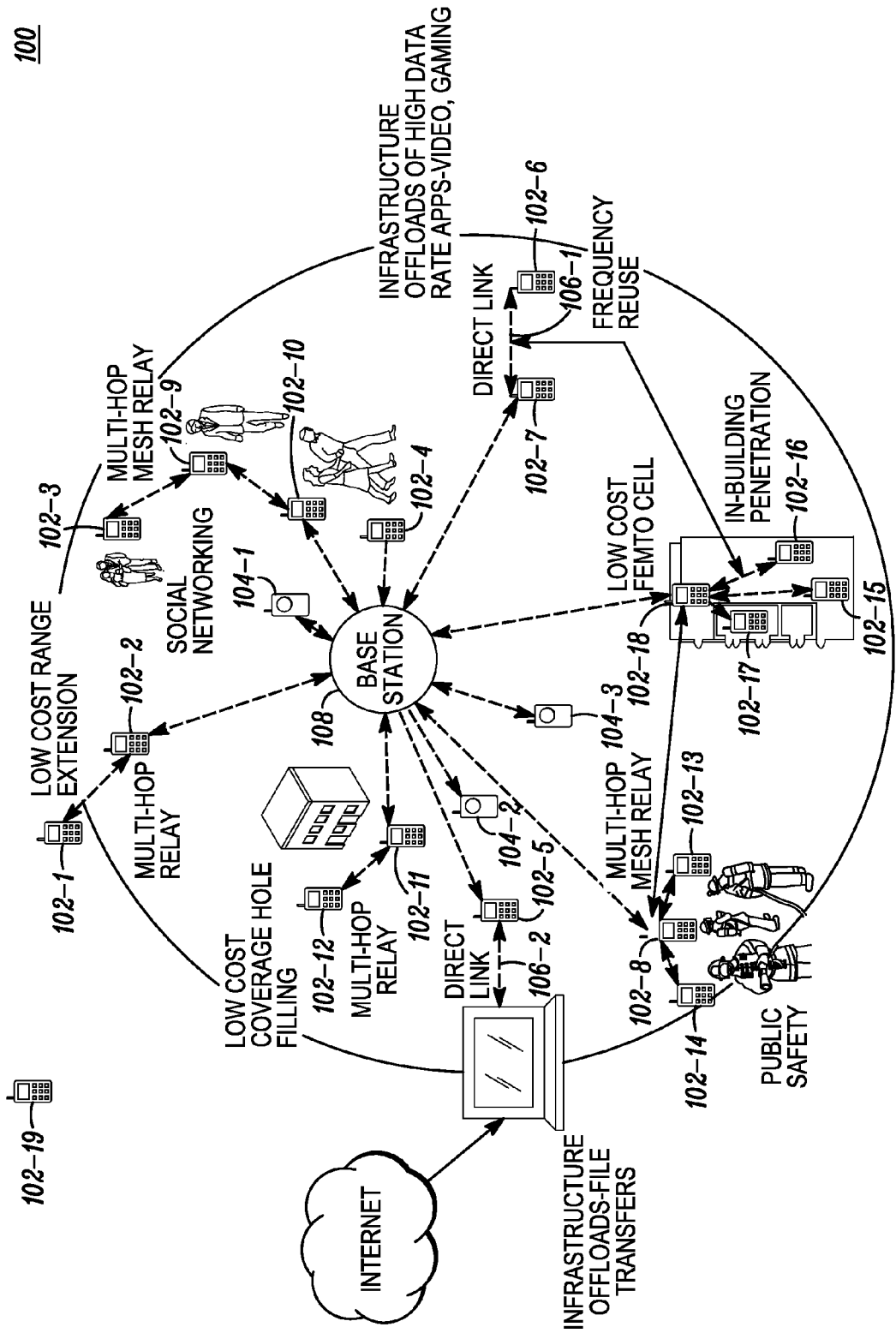
FIG. 1 is a block diagram illustrating an ad hoc network implementing the advantages of the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As described in the "Background" previously herein, the IMT-Advanced Network Topology requirement proposes multi-hop, mesh and P2P (peer-to-peer) modes. As such, the IEEE 802.16m operational requirements call for multi-hop relay support as well as self-optimization of network performance with respect to service availability, quality of service (QoS), network efficiency and throughput. Multi-hop relay opens tremendous opportunities for network architectures that scale with low cost mobile stations. The present invention exploits the peer-to-peer aspect of multi-hop relay with direct link and multi-hop mesh networking topologies. The multi-hop relay and self-optimization requirements support use cases such as low cost coverage extension, in-building penetration, public safety, and peer-to-peer communication for infrastructure off-loading, and applications such as social networking and gaming. An added benefit of peer-to-peer direct link is improved frequency reuse.

The present invention provides an extended frame format in an IEEE 802.16m system with methods to enable BS controlled direct link and mesh connections between handsets (single hop or multi-hop peer-to-peer communications sessions) as well as coverage extension of the IEEE 802.16 system. The term direct link and mesh is also referred to as "ad hoc relay" or an "ad hoc relay mode". The primary elements are a means to synchronize nodes that are out of the IEEE 802.16 system coverage and a means to enable IEEE 802.16m mesh capable nodes to find routes and negotiate reuse of spatially separate resources with peer nodes for the purpose of establishing peer-to-peer communications for coverage extension and other before mentioned use cases/applications.

FIG. 1 illustrates the advantages of enabling the peer-to-peer aspect of multi-hop relay with direct link and multi-hop mesh networking topologies. Specifically, FIG. 1 illustrates examples of IEEE 802.16m Direct Link/Mesh Use Cases.

As illustrated in FIG. 1, a hybrid mesh/ad hoc network 100 can include both legacy IEEE 802.16e mobile nodes 104-n and IEEE 802.16m ad hoc capable nodes 102-n. The key enablers for supporting direct link and multi-hop mesh for peer-to-peer (P2P) communication sessions are control and access mechanisms that allow mobile station (MS) peers (i.e. neighboring nodes 102-n and/or 104-n) to synchronize and communicate with one another.

The present invention enables multiplexing of mesh and direct links 106-n in the same frame as legacy IEEE 802.16e point to multi-point links. Furthermore, it specifically enables mobile mesh and direct link between mobile stations (102-n, 104-n). The present invention handles the asynchronous nature of peer-to-peer connections as well. The present invention enables mobile stations to not only be low cost fixed relay stations, but also to be mobile mesh capable (i.e. the mobile station can be a source, a destination, or a relay of user data). For example, mobile nodes 102-2, 102-8, 102-9, and 102-11 are illustrated in FIG. 1 as multi-hop mesh relays.

In peer-to-peer communications between MS nodes, both network synchronization and physical layer synchronization have unique requirements. In any wireless system, coverage holes exist. A key use case supported by direct link and mesh networking is the extension of service to MS nodes that are in coverage holes. This includes nodes at the fringe of coverage (for example, node 102-1 of FIG. 1), nodes that are shadowed (for example, node 102-12 of FIG. 1), and nodes that are in-building (for example, nodes 102-15, 102-16, and 102-17 of FIG. 1). The in-building penetration can be offered with an ad hoc relay (for example, node 102-18 of FIG. 1). In any of these cases, the approach to extending this service to an out of coverage MS node (for example, node 102-1 of FIG. 1) is through an in-coverage MS node (node 102-2 in FIG. 1). The MS node that is out of the coverage of the base station (BS) 108 must be able to synchronize their frames with in-coverage MS relays. The present invention provides a mechanism to perform network synchronization with out of coverage nodes. Those of ordinary skill in the art will appreciate that the relay node need not be a portable handset but may be a node deployed with the express intent of performing the duties of an MS relay. Such nodes are often referred to as seed nodes and, by their non-portable nature, may possess other attributes desirable in performing the duties of a relay; attributes such as a high-gain antenna, tethered power supply, and the like. Such a seed node can facilitate a multi-hop peer-to-peer connection between two MS nodes without linking with the BS.

Physical layer synchronization also places unique requirements on a system that enables peer-to-peer communications. The first requirement is related to automatic gain control (AGC). For example, if two nearby nodes at the fringe of a cell want to engage in a peer-to-peer communication, the physical layer preamble is used to set the AGC. If the AGC is set to the preamble received from the BS, then the data transmission from the nearby node may saturate the receiving node's receiver. Consequently, this invention provides a mechanism to set the AGC relative to the nearby transmitting peer node rather than to the preamble of the BS transmission. The second requirement is related to the mitigation of multi-access interference caused by allocation of adjacent resources to two transmitting nodes engaged in peer-to-peer communications, of which one is remotely located relative to the other with respect to one of the receivers. When such nodes engage in their respective transmissions, if the propagation delay is large enough, the symbols may be misaligned at the receiver, causing multi-access interference. The present invention provides a mechanism to mitigate these synchronization errors.

In a network that enables single or multi-hop peer-to-peer communications, the peer nodes need a mechanism for discovering a communication path between them. The discovery mechanism required to support single-hop peer-to-peer communications require at least the broadcast of Hello messages (or equivalent messages) while the equivalent discovery mechanism in a multi-hop peer-to-peer communications often requires the ability to broadcast route request (RREQ) messages to neighboring MS nodes to search for the optimal communication path. The multi-hop peer-to-peer discovery mechanism further frequently requires the ability to unicast route reply (RREP) messages through a potential succession of neighboring MS nodes when a communication path is discovered. The present invention provides a mechanism to enable broadcast, multicast, or unicast messages to be transmitted between peer MS nodes.

Finally, direct link, multi-hop relay, and multi-hop mesh relay topologies each require the ability to negotiate with a peer node for a traffic channel resource for peer-to-peer communications. The negotiation may require the BS 108 to assign the resource or the assignment may be determined strictly between the peer MS nodes. In this proposal, one outcome of the MS assignment is efficient reuse of spatially separate resources. This implies that individual peer nodes will have to negotiate with each other for resources that are perceived by each peer as being unused. As with the issue of route discovery, this resource negotiation requires the ability for a MS node to unicast resource negotiation messages in a way that would enable a neighboring MS node to receive the locally unicast message. These negotiations may or may not be supervised or controlled by the BS 108. The present invention provides a mechanism to enable unicast resource negotiation messages to be transmitted between peer MS nodes.

In summary, the mechanisms to enable BS 108 controlled direct link and mesh connections between wireless nodes in an ad hoc network are provided with an extended frame format with supporting methods. The primary elements are a means to synchronize nodes for peer communications and a means to enable IEEE 802.16m mesh capable nodes to establish peer-to-peer communications for coverage extension and other before mentioned use cases and applications. The extended frame format and supporting methods will be discussed herein below.

Medium Access Control (MAC)

IEEE 802.16e enables the addition of new zones in the frame structure. To support legacy IEEE 802.16e mobile stations in addition to new IEEE 802.16m mobile stations with ad hoc relay capabilities for direct link and multi-hop mesh networking, the present invention provides for a new "Ad Hoc Zone". This zone consists of logical control channels and/or traffic channels. The Ad Hoc Zone is dynamic in size, content and periodicity. The Ad Hoc zone is integrated into the IEEE 802.16e/m frame.

Figure 2A:
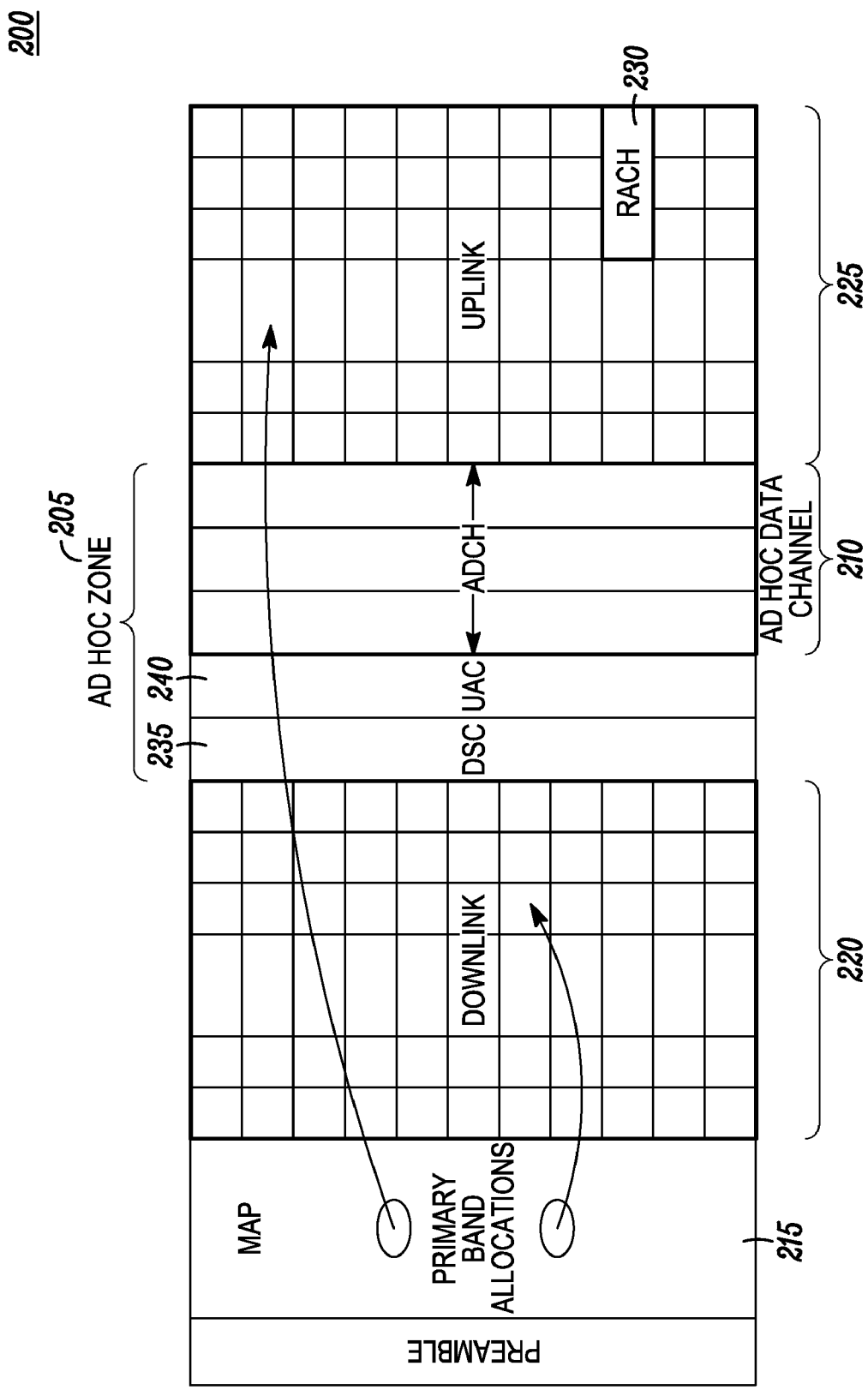
FIG. 2A illustrates an IEEE 802.16e/m frame structure in accordance with some embodiments.

FIG. 2A illustrates an IEEE 802.16m frame structure 200 with the new Ad Hoc Zone 205 integrated therein. The logical channels present in the Ad Hoc Zone can vary and may not contain all the channels illustrated in the Ad Hoc Zone of FIG. 2A. The addition of the Ad Hoc Zone 205 provides for the support a variety of use cases such as range extension for in-building penetration, coverage and throughput extension to fringe and shadowed users, and BS controlled multi-hop/mesh networking for peer-to-peer communications within an enterprise, campus, stadium, metro, and home environment.

With this frame structure, an integrated solution is provided for supporting legacy IEEE 802.16e MS nodes in a system configuration that also supports IEEE 802.16m ad hoc capable MS nodes. In an integrated coexistence scenario, the BS continues to serve IEEE 802.16e nodes, but additionally serves IEEE 802.16m ad hoc capable nodes using the Ad Hoc Zone 205 with the support of new functions within the BS. These new base station functions minimally include provision for controlling network synchronization of nodes that are out of the BS coverage, management of out of coverage nodes, and management of the size of the Ad Hoc Data Channel (ADCH) 210 resources. With these minimum additional BS functions, use of existing IEEE 802.16e spectrum allow for the establishment of direct link and multi-hop mesh connections for peer-to-peer communications utilizing traffic channel resources allocated from the Ad Hoc Data Channel 210 of FIG. 2A. It is also possible for traffic channel resources to be allocated from the uplink or downlink portions of the IEEE 802.16m frame with the appropriate physical layer changes. Resource allocations will be further discussed in the "resource allocations" section of this specification.

As illustrated in FIG. 2A, the frame structure 200 includes a MAP field 215 which continues to support resource grants for IEEE 802.16e/m devices as currently defined where the grants identify resource allocations from the downlink (DL) 220 or uplink (UL) 225 portions of the frame 200. The new IEEE 802.16m ad hoc capable devices will also be supported in the same fashion for any direct connection with the base station. Grants for resource allocations from the Ad Hoc Data Channel 210 for direct link and multi-hop mesh will not be specified in the MAP 215. Further details regarding the allocations will be discussed herein after.

Within the uplink portion 225, a Random Access CHannel (RACH) 230 provides traditional functionality for multiple-access using Code Division Multiple Access (CDMA) Codes including allowing multiple nodes to transmit in the channel simultaneously using separate orthogonal spreading codes, which allow one or more receivers to receive one or more of the transmitted signals simultaneously. In an alternate configuration, the RACH channel may not possess provisions for multiple-access and may instead be a single-access channel.

The DL 220 and UL 225 are traffic channel resources managed by the BS for downlink and uplink communications with the BS. The MAP 215 is used by the BS to communicate the resource grants to the individual IEEE 802.16e nodes as well as IEEE 802.16m ad hoc capable nodes for all direct connections with the BS. In accordance with the present invention, the DL 220 and/or UL 225 portions of the IEEE 802.16m frame 200 are also used as available traffic channel resources for peer communications with the appropriate physical layer changes.

The Distributed Synchronization Channel (DSC) 235 is a logical channel and is allocated as part of the Ad Hoc Zone 205 by the BS. The DSC 235 only needs to be present periodically (e.g. every twenty (20) milliseconds (msec)). The DSC 235 can be present in all or some of the Ad Hoc Zones 205. The content of the DSC 235 includes parameters to support network synchronization as well as paging channel elements, a paging group identifier, a network identifier, state information, Ad Hoc Data Channel descriptors, size and periodicity of the Ad Hoc Zone and Ad Hoc channels, and the like. At least a subset of IEEE 802.16m nodes share the responsibility to transmit the DSC 235. For example, the network may be configured such that only in-coverage IEEE 802.16m nodes share the responsibility to transmit the DSC. One method for utilizing the DSC for network synchronization is described in U.S. Pat. No. 7,272,129 to Calcev et al, entitled "Method And Apparatus For Synchronizing A Node Within An Ad-Hoc Communication System," granted on Sep. 18, 2007, assigned to the assignee of the present invention, whose contents are incorporated by reference in its entirety herein.

The Unscheduled Access Channel (UAC) 240 is a multi-access channel and is provided for IEEE 802.16m ad hoc capable nodes that can operate in a direct link or multi-hop mesh connection. These nodes require the ability to communicate directly with peer nodes with broadcast, multicast, or unicast messages. The UAC 240 provides a vehicle for routing procedures, resource negotiation procedures, and beaconing procedures (which may include paging procedures for out-of-coverage nodes). For example, the UAC 240 allows ad hoc capable nodes to find and establish routes between the source and destination nodes. Once a route is identified, these nodes require the ability to negotiate with each other for traffic channel resources. The negotiating MSs can determine which resources should be allocated from the Ad Hoc Data Channel 210 of the Ad Hoc Zone 205, or the BS may provide the resource allocation from the UL 225 or DL 220 portions of the frame, or the BS may provide the resource allocation from the Ad Hoc Data Channel 210 of the Ad Hoc Zone 205. Therefore, the UAC 240 allows peer nodes to communicate by enabling the broadcast or multicast of messages such as route request (RREQ) messages, Hello messages (to establish the local neighborhood), or DSC transmission protocol messages, or the like, and the unicast of messages such as resource negotiations (e.g. request to send (RTS), clear to send (CTS), and clear for transmission (CFT), or route reply (RREP) messages, or the like.).

Attempts to use the UAC 240 for messages such as RTS, CTS, or CFT (or any of the other before mentioned messages) are accomplished with a pool of CDMA codes that enable simultaneous access to the channel. Spread OFDM (e.g. multi-carrier CDMA) can be used to enable sufficient processing gain for simultaneous access. The bandwidth of the channel would dictate the number of symbols required to transmit these messages. To minimize the number of symbols reserved each frame for the UAC 240, messages may need to span multiple frames at the expense of additional latency to decode. In this case, it will be necessary to establish a unique UAC frame boundary so that one node does not start the transmission of a new message in the middle of the transmission of another message by another node. In essence, a UAC logical channel 240 may contain more symbols than a single Ad Hoc Zone. In the event that a node was unable to decode an RTS directed to it because of the simultaneous transmission of an RTS, CTS, or CFT to another node (i.e. a node cannot transmit and receive at the same time), it will be the responsibility of the sending node to retransmit the RTS after a delay. When a node receives an RTS, it will randomly select a UAC logical channel 240 to transmit a CTS to mitigate the probability that simultaneous RTS messages result in simultaneous CTS transmissions. Since the CTS and CFT are not acknowledged messages, nodes will not be able to rely on these messages to build a map of occupied Ad Hoc Data Channel (ADCH) resources (i.e. a node that is transmitting an RTS will not hear a simultaneous transmission of a CTS or CFT). Nodes will either need to rely on measurements of the ADCH resources or will need to rely on the next RTS/CTS/CFT negotiation for a long term allocation of the ADCH resource.

The UAC 240 can be split up such that routing messages such as RREQ and Hello are separated from the direct link resource negotiation messages such as RTS, CTS, and CFT. Alternatively, certain UAC channels may be dedicated to RREQ, while other UAC channels may be dedicated to HELLO, and while still other UAC channels may be dedicated to RTS/CTS/CFT. Periodically, additional slots/symbols could be provided for RREQ and Hello, or the existing slots/symbols could be alternated between RREQ and RTS/CTS/CFT.

It will be appreciated by those of ordinary skill in the art that the number of CDMA codes should be kept small to minimize the search time and receiver complexity, yet large enough to mitigate collisions. The number of available CDMA codes depends on the spreading factor, which should not be larger than necessary to minimize bandwidth wastage.

A node that receives a message that is part of a sequence of message transmissions, such as a RTS/CTS/CFT negotiation, will transmit any response using the same CDMA code in which the message was received. This will reduce the chance of collisions among simultaneous messages.

The Ad Hoc Data Channel (ADCH) 210 within the Ad Hoc Zone 205 provides communication resources for nodes that operate in an ad hoc relay mode, either for direct link or mesh connections. This is dependent on system configuration and traffic requests. The resources are negotiated on the UAC 240 channel or are arbitrated by either the BS, the node transmitting the DSC or a combination of both. Resource allocations will be further discussed with respect to the physical layer (PHY) herein after.

Figure 2B:
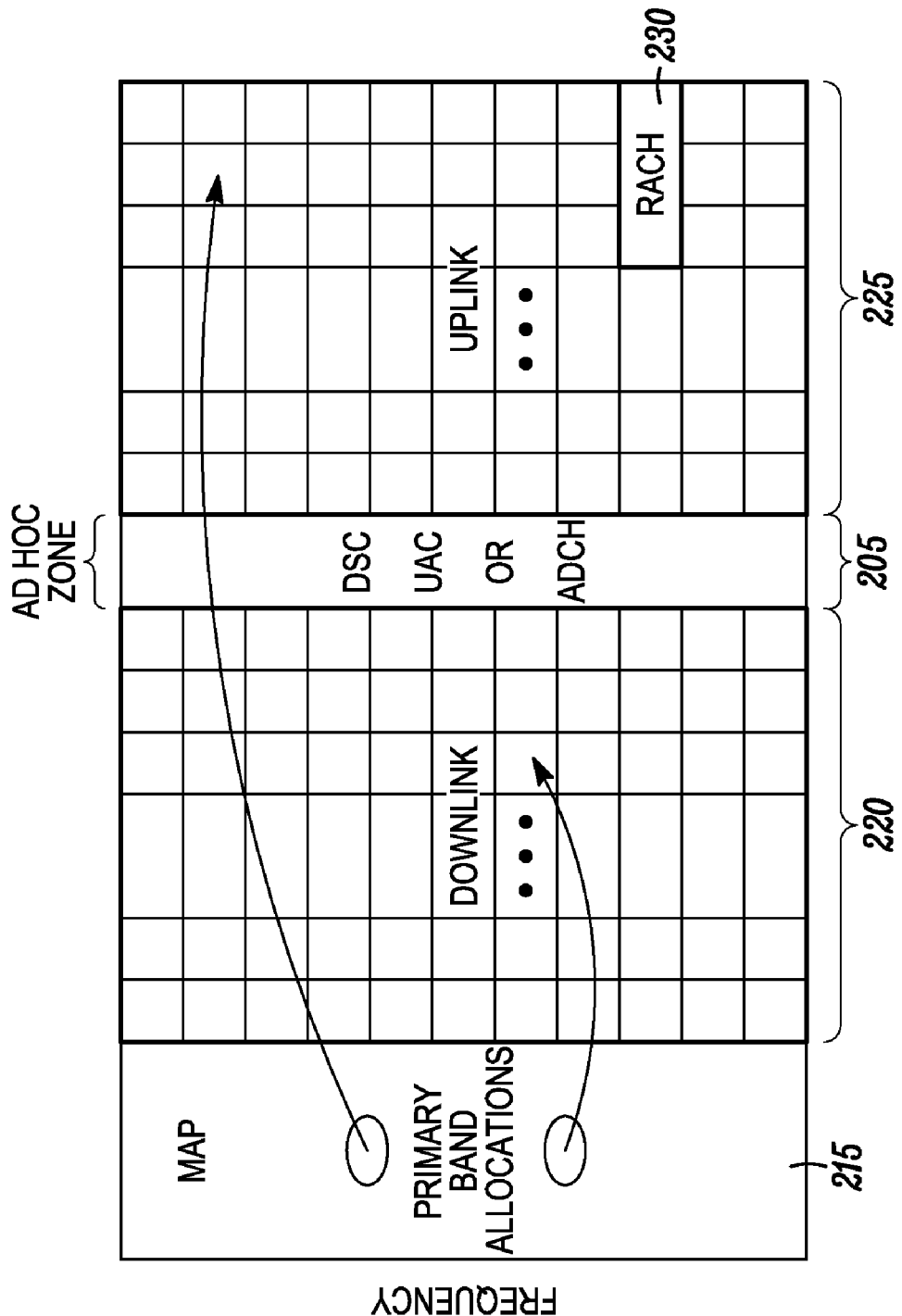
FIG. 2B illustrates an alternative IEEE 802.16e/m frame structure in accordance with some embodiments.

The Ad Hoc Zone 205 need only be present within the IEEE 802.16m portion of the frame on a periodic basis and is a function of the traffic demands for direct link and mesh connections. The DSC 235, UAC 240, and ADCH 210 logical channels can be present at the same time or at separate times. For example, FIG. 2B illustrates an example frame where the Ad Hoc Zone 205 only contains one of a DSC, a UAC, or an ADCH. The MAP 215 and the DSC 235 describe the configuration and periodicity of these logical channels of the Ad Hoc Zone 205. The Ad Hoc Zone 205 can occupy as little as four (4) symbols in a frame with a minimum periodicity of one DSC 235 and one UAC 240 every twenty (10-20) frames.

Figure 3:
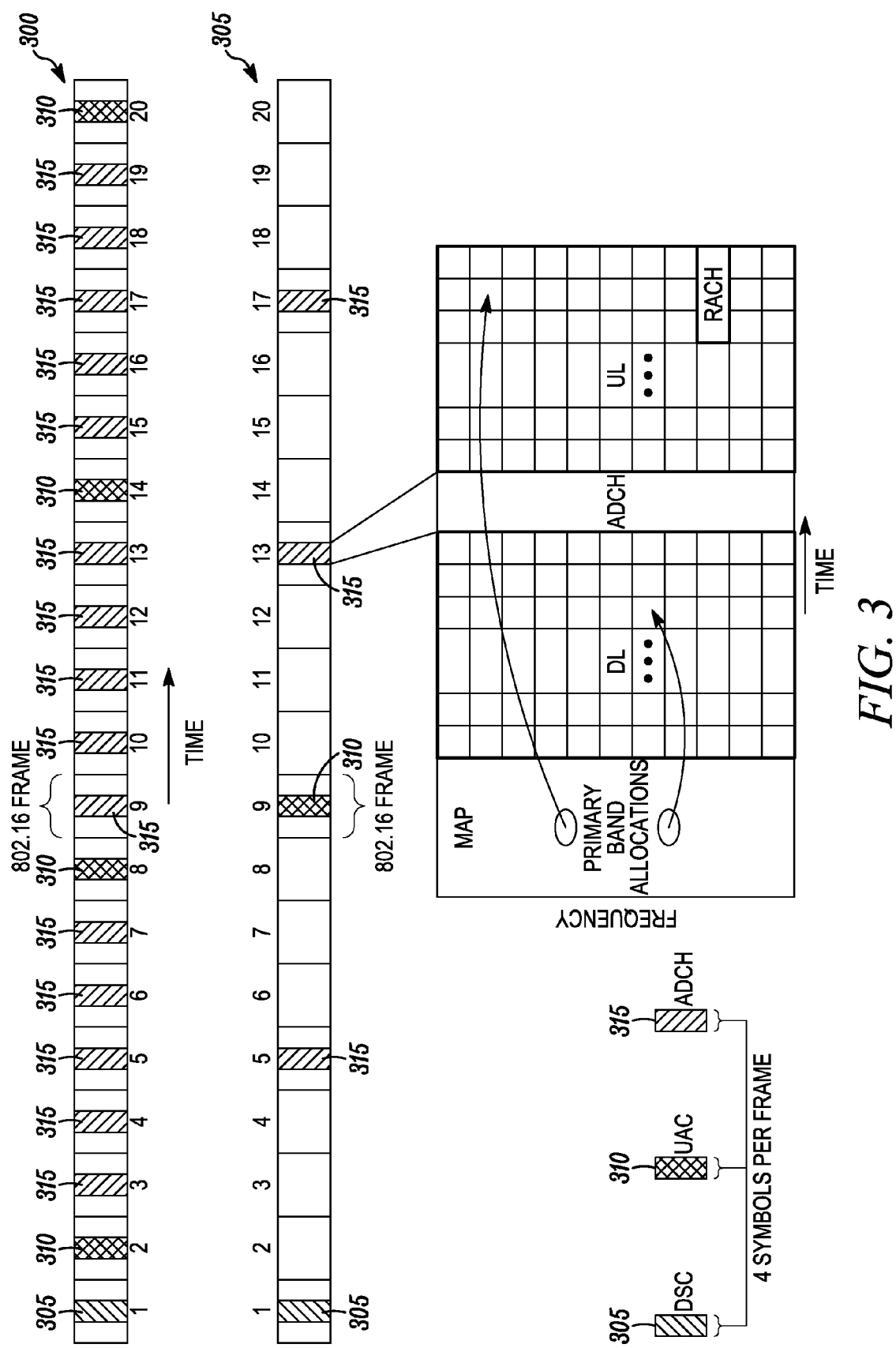
FIG. 3 illustrates two example ad hoc zone distributions in accordance with some embodiments as associated to the frame structures of FIGS. 2A and 2B.

FIG. 3 illustrates two example ad hoc zone distributions in accordance with some embodiments as associated to the frame structures of FIGS. 2A and 2B. Specifically, FIG. 3 illustrates an example a first frame distribution 300 of a heavier loaded system of Ad Hoc Zones; and a second example frame distribution 305 of a lighter loaded system of Ad Hoc Zones.

As illustrated by distribution 300, a system supporting a heavy load of direct link and mesh traffic might have one Ad Hoc Zone per frame consisting of a DSC 305, a UAC 310, or an ADCH 315. In this example, the repetition pattern of the Ad Hoc Zone might contain one DSC, four UACs, and 15 ADCHs every 20 frames.

In a lighter loaded system distribution 305, there might only be one Ad Hoc Zone every fourth frame with a repetition pattern of one DSC, one UAC, and 3 ADCHs every 20 frames.

It will be appreciated by those of ordinary skill in the art that the quantity and proportion of DSC, UAC, and ADCH channels in the pattern may vary and any changes in the pattern are indicated in DSC transmissions. Nodes using the Ad Hoc Zone will be made aware of the pattern of logical channels in the Ad Hoc Zones that follow by monitoring any DSC channel. Changes in the pattern are dynamic in nature and are informed in the DSC channel. For example, if the BS realizes that more UAC logical channels are necessary, the next DSC channel will inform nodes about a new allocation pattern that would have multiple UAC logical channels.

Figure 4:
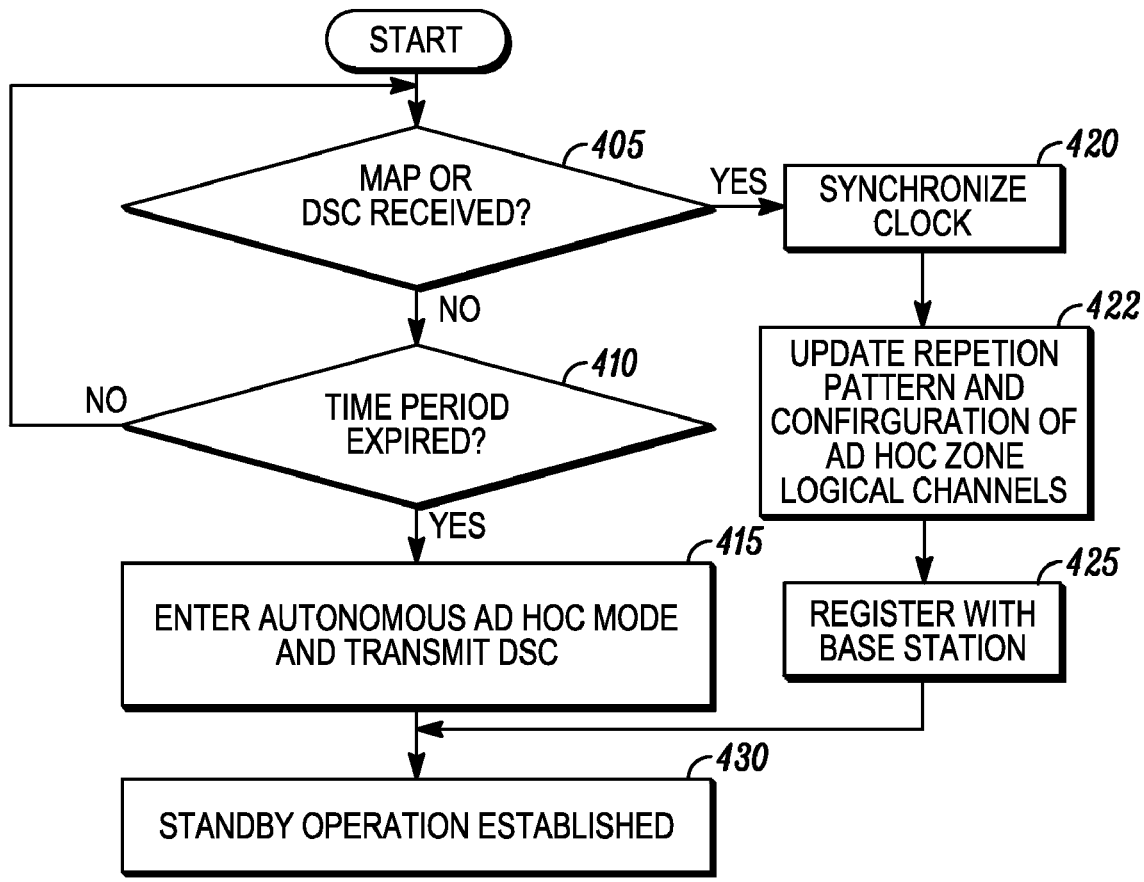
FIG. 4 is a flowchart illustrating a node operation initializing standby operation within a network in accordance with some embodiments.

FIG. 4 is a flowchart illustrating a node operation 400 using the IEEE 802.16m frame enhancements in accordance with some embodiments of the present invention. Specifically, FIG. 4 illustrates an operation of a node 102-19 initializing standby operation within the network 100 of FIG. 1.

As illustrated, the operation begins with Step 405 in which it is determined whether or not a node 102-19 has received a MAP of an IEEE 802.16m BS or a DSC from another IEEE 802.16m node (i.e. node 102-2) with an indication of the presence of infrastructure.

Referring to FIG. 1 for describing the operation of FIG. 4, suppose now a node 102-19 that had not received either a MAP of an IEEE 802.16 BS or a DSC from another IEEE 802.16m node 102-2 with an indication of the presence of infrastructure, the operation continues to Step 410 in which it is determined whether a pre-determined period of time has expired. When the pre-determined period of time has not expired, the operation cycles back to Step 405 to continue checking for receipt. When the pre-determined period of time has expired, the operation continues to Step 415 in which the node 102-19 is permitted to use the IEEE 802.16m frame structure 200 with the new Ad Hoc Zone 205 incorporated therein described above to support an autonomous ad hoc networking mode without BS control, either for direct link or mesh connections. The node 102-19 would begin transmitting a DSC, indicating absence of infrastructure. In this scenario, the duration of the Ad Hoc Zone can be presumed to be the maximum allowed value. The node 102-19 would also indicate in its transmission the allocation of UAC logical channels. If a node 102-1 that has received a DSC from the node 102-2 with an indication of the presence of infrastructure receives a DSC from the node 102-19 with an indication of absence of infrastructure, the node 102-1 would send a DSC message to the node 102-19 with an indication of the presence of infrastructure. In such case, the node 102-19 would respect the presence of infrastructure and would cease transmissions of DSC messages.

Returning to Step 405, when the node 102-19 receives the MAP of an IEEE 802.16m BS or a DSC from another IEEE 802.16m node 102-2, the operation continues to Step 420 in which the node 102-19 synchronizes to the IEEE 802.16m system clock. Next, in Step 422, the node 102-19 updates its knowledge of the Ad Hoc Zone's repetition pattern and configuration of the zone's logical channels. This will enable node 102-19 to listen for communications from other ad hoc relay capable IEEE 802.16e/m nodes. Next, in Step 425, the node 102-19 registers with the base station. If the node 102-19 receives the IEEE 802.16m BS MAP, it will register with the BS per the defined IEEE 802.16m system protocols. If it does not receive the MAP from the BS, but receives a DSC from another IEEE 802.16m node 102-2, it will first find a route to the IEEE 802.16m BS using the UAC channel of the Ad Hoc zone and will then register with the IEEE 802.16m BS.

Next and after Step 415, the standby operation of the node within the network is established accordingly.

It will be appreciated by those of ordinary skill in the art that, in accordance with the present invention, all non-sleeping nodes must listen to the UAC in order to hear and respond as appropriate to broadcast, multicast, or unicast messages. Given the possibility that multiple messages with different spreading codes may be received at the same time, nodes must "look" for all spreading codes to avoid loss of messages that could potentially be decoded.

Figure 5:
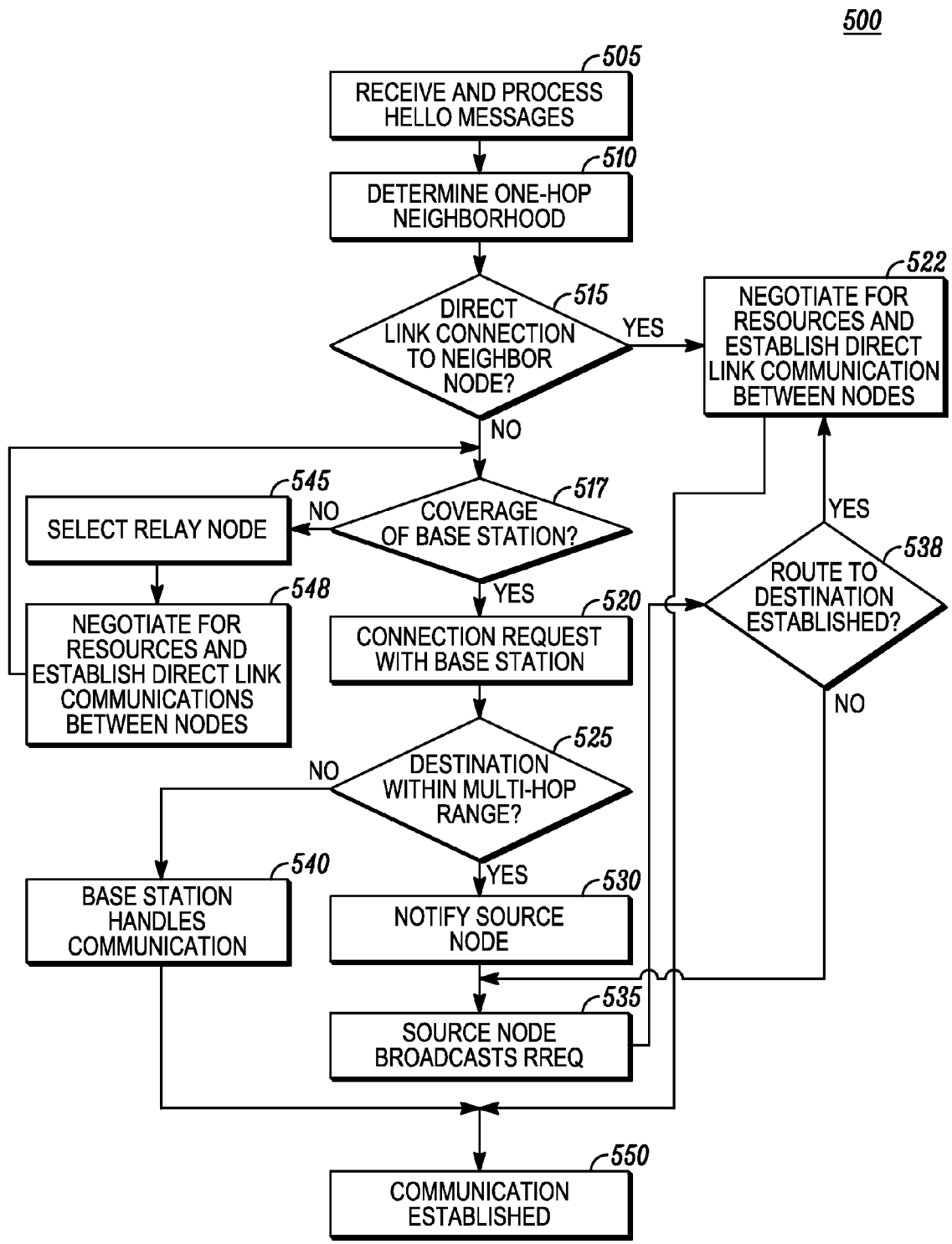
FIG. 5 illustrates an operation of a system in establishing communication links between nodes within a network in accordance with some embodiments.

FIG. 5 is a flowchart illustrating a system operation 500 in accordance with some embodiments of the present invention. Specifically, FIG. 5 illustrates an operation 500 of the system in establishing communication links between nodes within the network. As illustrated in FIG. 5, in Step 505, at least a subset of non-idle ad hoc capable nodes, or non-idle ad hoc capable nodes that are out of coverage (as determined by the BS) receive and process periodic HELLO messages (or equivalent messages that contain identify information) received from neighbor nodes. Next, in Step 510, a node determines the identity of nodes in its one-hop neighborhood. The node is aware of the identities of the nodes in its one-hop neighborhood based on the content of the periodic Hello messages. The one-hop neighborhood range will be limited by the signal/noise measurement of the Hello message.

Next, in Step 515, the source node determines whether it can establish a direct link connection with a neighbor node. A node can only establish a direct link connection with a one-hop neighbor if it is known from the periodic Hello messages that they are within an acceptable range.

When the desired destination node is within the known neighborhood, in Step 522 the source node establishes communication with the destination node via a direct link by negotiating with the destination node for an unused resource. When a node receives a resource negotiation request (e.g. RTS) from a direct link neighbor node, the request will either be with respect to resources in the Ad Hoc Data Channel or will be with respect to resources allocated by the BS from the UL or DL portions of the frame. The location, size, and use of the Ad Hoc Data Channel are described either in the DSC or the MAP. For direct link negotiation requests from the Ad Hoc Data Channel, the resource negotiation between nodes consists of an RTS from the source, a CTS from the destination that identifies a list of resources that the destination perceives to be idle (i.e. measured energy above a threshold that would imply the resource is currently being used), and a CFT from the source that identifies a selected resource from the resource list that the source agrees is also idle. Resource allocations will be discussed further in the next section.

Returning to Step 515, when the desired destination node is not within the known neighborhood, the source node determines whether or not it is in the coverage area of a base station in Step 517. When the source node is in the coverage area of a base station, the source node will next make a connection request with the BS in Step 520. If a node wants to make a connection request to the BS either for itself or on behalf of an out-of-coverage node, the node randomly selects a CDMA Code and transmits this code as an access request over the RACH as currently defined for IEEE 802.16e. The BS then allocates an UL resource for the sender of this code which gives the node a chance to identify itself and its requirements to establish a connection.

Next, in Step 525, the base station determines whether the desired destination node is within the multi-hope range of the source node. In Step 530, when the BS receives a connection request from an IEEE 802.16m ad hoc capable node to be connected to another IEEE 802.16m ad hoc capable node, the BS may reply to the requesting node with an indication that the destination node is within an acceptable multi-hop range of the requesting node (e.g. source and destination are within same sector or same cell). In other words, when the desired destination node is within the multi-hop range of the source node, the BS will inform the source node.

In an alternate embodiment, the BS could assist in the route discovery. In this embodiment, the BS would instruct both the source node and the destination node to simultaneously discover a route respectively to the destination and source nodes to reduce the time for discovery and the extent of the broadcast storm. This procedure is described in United States Patent Publication Number US20040264422A1 to Calcev et al, entitled "Method And Apparatus For Route Discovery Within A Communication System," published on Dec. 30, 2004, assigned to the assignee of the present invention, whose contents are incorporated by reference in its entirety herein. When the route discovery from the source and destination intersects, the BS would be notified and the discovered route would be made known to the source node.

Next, in Step 535, if allowed and indicated by the BS, the source node broadcasts a RREQ on the UAC to discover a multi-hop route to the destination. In this scenario, the requesting node can then use the UAC to broadcast a RREQ message to discover a multi-hop route to the destination.

Next, in Step 538, it is determined whether or not a route to the destination has been established. When the route has not been established, the operation cycles back to Step 535. When the route has been established, the operation proceeds to Step 522.

If a node receives the RREQ message on the UAC, the node rebroadcasts the RREQ on the UAC if the receiving node is not the destination node. If the receiving node is the destination node, the node will unicast a route reply on the UAC to the node that broadcast the RREQ so that the route reply can be relayed back to the source node. It will be appreciated by those of ordinary skill in the art that the details of the routing procedure (route discovery and maintenance) can vary. For example, the BS could provide the routing information to the node. Nodes could report their one-hop neighbors to the BS, which could then determine the route on behalf of the nodes.

In an alternate embodiment, if the node is within coverage of the BS, then the BS may provide the route to the MS node in a unicast message in the DL frame part in response to a RREQ message unicast to the BS in the UL frame part. Nodes that are outside of the coverage of the BS, though, must still broadcast the RREQ message on the UAC.

When the desired destination node is not within the multi-hop range of the source node in Step 525, the operation continues to Step 540 in which the connection to the destination is handled by the BS using the traditional point to multipoint call set up protocols.

Returning to Step 517, when a node is not within coverage of the BS and its desired destination node is not within its one-hop neighborhood, the node must select a one-hop neighbor to relay a connection to the BS in Step 545. The Hello messages contain a hop count to the BS to allow the source node to choose the shortest hop route to the BS. The knowledge of the neighborhood further can be extended to knowledge of the two-hop neighborhood with a report on the neighbors of the one-hop neighbors.

Next, in Step 548, the source node establishes communication with the selected one hop neighbor node via a direct link by negotiating with the selected one hop neighbor node for an unused resource using a procedure as described previously herein between the source and destination node for Step 522. The operation then cycles back to Step 517.

Lastly, in Step 550, communication is established between the source node and destination node after Steps 540, and 545.

Resource Allocations

For IEEE 802.16m, in accordance with the present invention, the channel structure of the IEEE 802.16e/m frame is divided into zones that contain slot assignments for IEEE 802.16e uplink and downlink traffic, IEEE 802.16m uplink and downlink traffic, and an IEEE 802.16m ad hoc zone that includes traffic channel resources for peer-to-peer communications. In the MAC Changes described previously, it was described that resources could either be negotiated between peer nodes from the Ad Hoc Data Channel of the Ad Hoc Zone or from the UL or DL portions of the IEEE 802.16m frame of FIG. 2.

Resources may be allocated as either full band allocations or as sub-channel allocations. Full band allocations have less stringent physical layer requirements as it relates to AGC than do sub-channel allocations, but both allocation methods have the same physical layer synchronization requirements. If resources can be assigned as sub-channel allocations, the allocations can be sized to match the traffic requirements of the application.

In accordance with some embodiments of the present invention, resource allocations for peer-to-peer communications using direct link or mesh connections are allowed only up to a maximum range (e.g. 100 meters) to reduce the delay spread requirements in the physical layer design related to synchronization and AGC.

Enabling the BS to allocate direct link and mesh connection resources from the UL or DL portions of the IEEE 802.16m frame will provide the BS with more control over the IEEE 802.16 spectrum. On the other hand, BS directed allocations from the UL or DL portions of the IEEE 802.16m frame will eliminate the ability of the peer MS nodes to negotiate reuse of spatially separated resources from the Ad Hoc Data Channel. Alternatively, in cases in which the UAC logical channels do not offer enough bandwidth for negotiation, resources from the Ad Hoc Data Channel may be coordinated by the base station, nodes that transmit the DSC or a combination of both.

When resources are negotiated between peers for direct link or mesh connections from the Ad Hoc Data Channel (ADCH) of the Ad Hoc Zone, the peer nodes can make local measurements of the resources to enable improved frequency reuse. The use of the ADCH resources will require the dynamic adjustment of the size of the ADCH based on traffic demands. The size of the ADCH must be broadcast in the system MAP and replicated in the DSC.

PHY Changes

Physical layer synchronization and hardware AGC are topics that will drive the need for changes in the physical layer design to support direct link and mesh connections for peer-to-peer communications. These topics will be discussed separately.

Protection Against Synchronization Errors

In the traditional system, all of the transmissions on the downlink are automatically synchronized because they all originate at the base station (BS). The ranging process is used to ensure that uplink transmissions are synchronously received at the BS, i.e., they are time-aligned with the BS receive frame and arrive at the expected times.

The ranging process, however, does not guarantee that peer-to-peer transmissions among mobile station nodes are all synchronously received at other MS nodes. As a result, when the full band is allocated to each peer-to-peer link, adjacent symbols received from different MS nodes (one of which is the desired source) could overlap, with the extent of overlap depending on propagation delay differences among the transmitters and receivers, i.e., depending on the locations of the BS, the transmitting MS nodes, and the receiving MS node. The effect of time-misalignment of received signals is multiple access interference. When the tail of the last symbol transmitted by one user overlaps with the head of the first symbol transmitted by a second user, then if the extent of overlap is small enough, the interference to the second user is absorbed by the OFDM cyclic prefix of the symbol. However, no protection is afforded to the first user's signal and the resulting interference degrades performance.

Figure 6:
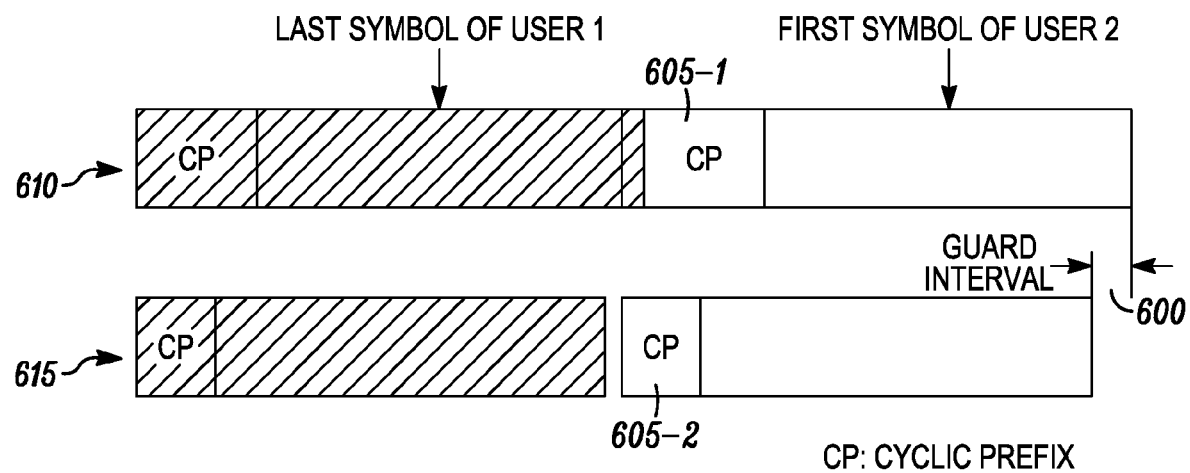
FIG. 6 illustrates an example of timing error in peer-to-peer links with full-band allocations in accordance with some embodiments.

This problem can be overcome by introducing a guard time 600 between slots allocated to different users as illustrated in FIG. 6. The duration of the guard time 600 should exceed the worst-case timing error expected. FIG. 6 illustrates timing error in peer-to-peer links with full-band allocations. In FIG. 6, frames 610 illustrate legacy symbols. Frames 615 illustrate shorter symbols with a guard interval 600.

However, when individual sub-channels may be allocated to different peer-to-peer links with orthogonal frequency division multiple access (OFDMA), time misalignment of signals received on adjacent sub-channels would cause multiple access interference (actually due to inter-carrier interference among these sub-channels) to every symbol. In this case, a single guard interval at the end of the slot is not sufficient. A cyclic postfix 605-*n* can potentially serve to provide protection to the tail of each symbol.

Figure 7:
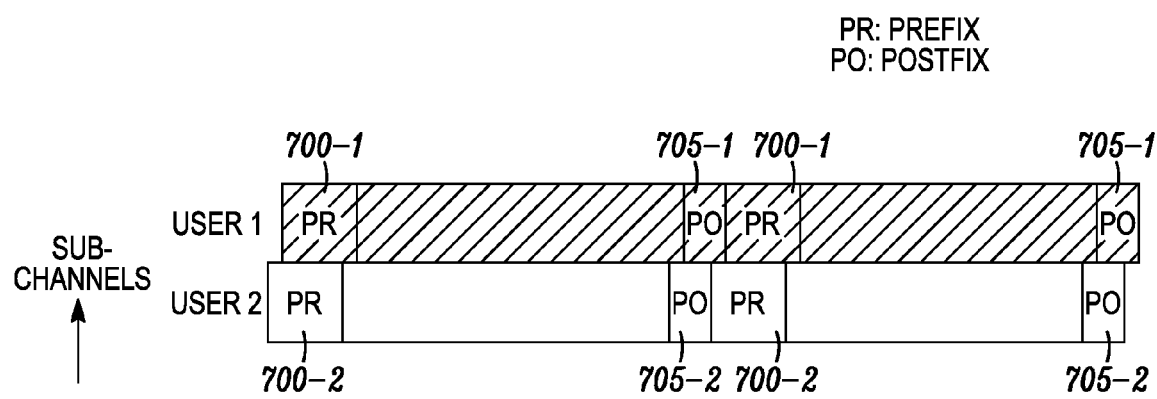
FIG. 7 illustrates an example of timing error in peer-to-peer links with OFDMA in accordance with some embodiments.

FIG. 7 illustrates timing error in peer-to-peer links with OFDMA. As illustrated in FIG. 7, a prefix (PR) 700-*n* and a post fix (PO) 705-*n* can be implemented. Here again, the length of the cyclic postfix 705-*n* must exceed the worst-case timing error. The cyclic prefix length can potentially be reduced to maintain the total symbol duration without causing other problems. An additional guard interval between slots is not necessary in this design.

Hardware AGC

Traditionally, MS nodes perform automatic gain control (AGC) using the preamble transmitted by the BS at the beginning of each frame. On peer-to-peer links, however, the received signal power may be substantially different from that with which the preamble is received. Therefore the receiver front end may either be saturated or desensitized depending on whether the power received from the MS node is too high or too low compared with the power received from the BS. Therefore, the AGC in the MS receiver must be readjusted for receiving the signal from another MS node. This suggests the need to include a preamble at the beginning of the slot(s) allocated to the peer-to-peer link. Such a preamble should be longer than the AGC settling time but can conceivably be much shorter than a data symbol. The motivation for such a design would be reduction of overhead. It might be possible to use the first part of the cyclic prefix of the first symbol of the allocated slot for AGC. Alternatively, an appropriately designed signal can be supplanted and the first symbol may then be demodulated with suitable processing to account for this non-cyclic prefix.

When the full band is allocated to an MS-to-MS link, the optimum AGC level remains approximately the same for a long period of time, the duration of which is related to channel variability, i.e., mobility. The AGC sub-system in the MS receiver may be able to remember the correct AGC level for the downlink and each peer-to-peer link that it is actively receiving. If this is possible, the AGC sub-system need not operate during every frame. The correct AGC level for each signal being decoded can be retrieved from memory. This suggests that the preamble can be transmitted at the rate of the desired AGC correction.

With OFDMA, considering any slot of a frame, sub-channels may be allocated to different (peer-to-peer) links in successive frames. Then, for a MS receiving a signal on a set of sub-channels, the power of signals received on other sub-channels—and hence the total received power—can potentially change drastically from frame to frame depending on the location and power of the transmitters using the other sub-channels. Therefore, it is necessary for the receiver to perform AGC in every frame and, hence, a preamble must be transmitted at the beginning of each allocation in every frame. This essentially means that a preamble must be transmitted in every slot. To minimize the overhead, therefore, it is desirable to use a short preamble as suggested above.

Extended MAC for Alternate Frequency Bands

The support for a multi-hop mobile mesh for peer-to-peer (P2P) connections and range extension can be enhanced with access to alternate frequency bands such as new broadband licensed IMT-Advanced spectrum or unlicensed broadband spectrum or opportunistic spectrum such as TV whitespace. This enhanced capability requires the use of a second transceiver that the BS uses to manage the alternate band.

Figure 8:
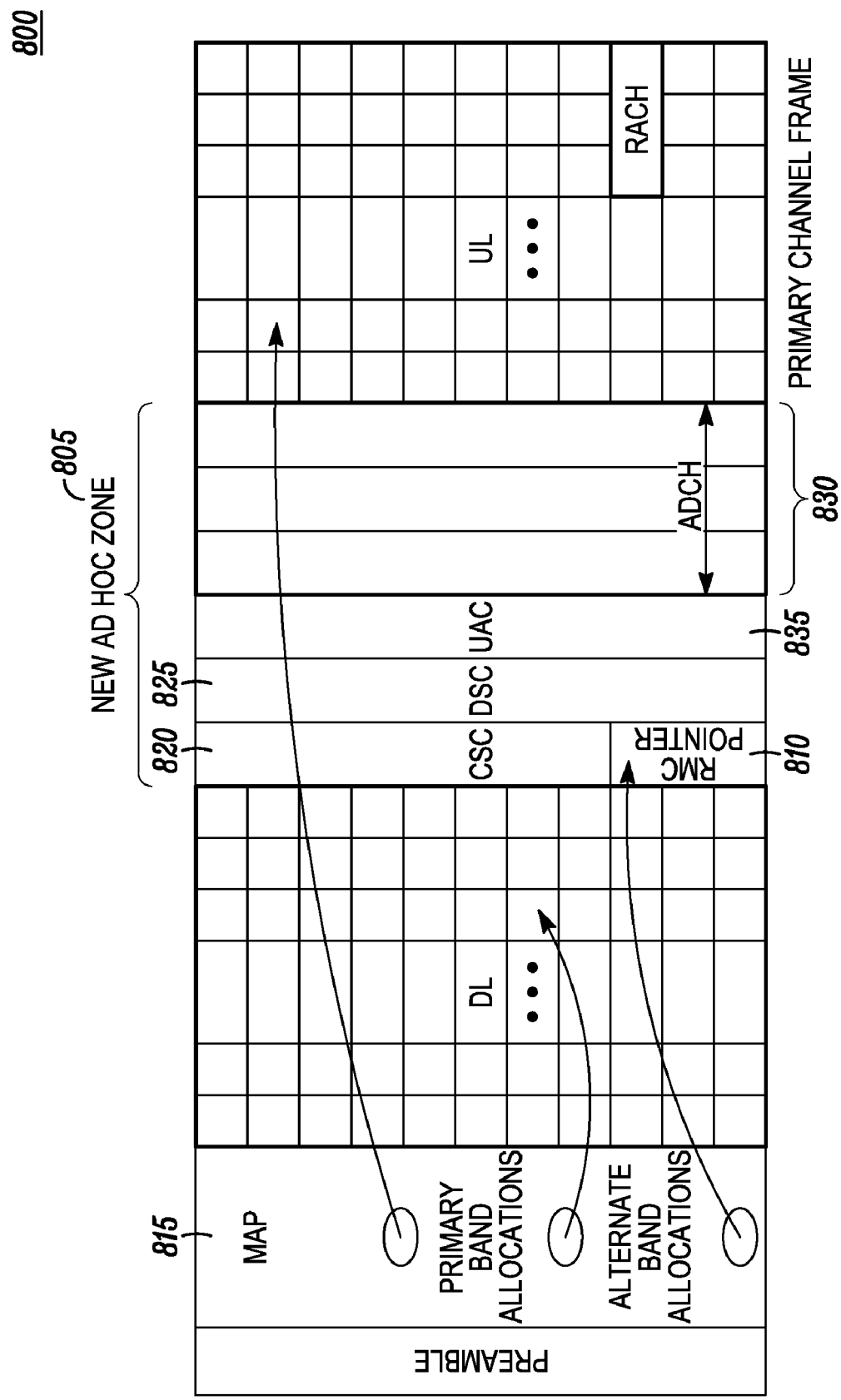
FIG. 8 illustrates an alternative IEEE 802.16e/m frame structure in accordance with some embodiments.

FIG. 8 illustrates how the frame format 800 and Ad Hoc Zone 805 could be extended to support access to alternate spectrum or frequency bands. Here, the Ad Hoc Zone 800 in the primary channel frame contains a new element called an RMC (Resource Management Channel) pointer 810. When the BS chooses to allocate resources from the alternate band to a new IEEE 802.16m ad hoc capable node, the BS will provide a downlink resource grant in the IEEE 802.16e MAP 815 that points to the RMC pointer information element 810. The RMC pointer 810 may be part of the IEEE 802.16e MAP or part of a logical channel within the Ad Hoc Zone 805, either of which is broadcast by the BS. The RMC pointer information element 810 contains parameters that describe the alternate band such as the frequency, bandwidth, time offset to the next frame that starts with the RMC 810, and other usage parameters. Thereafter, all resource grants for this IEEE 802.16m ad hoc capable node will be found in the alternate band RMC. Alternatively, the initial grant for the IEEE 802.16m ad hoc capable node is a unique message or information element in the IEEE 802.16e MAP 815 that directs the node to use the alternate band based on the parameters of the RMC pointer information element 810. The decision by the BS to allocate resources from the alternate band is based on the system configuration. Resource allocations from the alternate broadband spectrum (licensed or unlicensed or opportunistic/TV whitespace spectrum) could be part of standard access protocols or could be offered as an alternate overflow band when access demands additional capacity. The alternate overflow band could also be provided for lower or higher QoS applications depending on the spectrum assignment.

In accordance with the present invention, to manage the alternate broadband traffic channels, advanced base station capabilities are optionally supported. Management of a secondary channel in an alternate band includes responsibilities for management of the Ad Hoc Data Channel traffic channel resources in the alternate band, adaptive bandwidth, and opportunistic spectrum access using cognition for spectrum agility, interference avoidance, and spectrum sharing and coexistence. Enhanced methods for managing the efficiency of resource allocations may also be an advanced BS capability. These capabilities continue to support multi-hop/mesh/peer-to-peer network topologies and coverage enhancement, but also enhances the capabilities of in-coverage nodes, providing support for higher throughput, higher capacity, battery conservation for ad hoc devices, scalable bandwidths that are extensible to large bandwidths, and with respect to unlicensed band access the capabilities offer interference mitigation and higher QoS with QoS management built into MAC/PHY.

In the frame structure 800, the fields of the primary frame described relative to FIG. 2 remain the same. An additional field is the Cluster Synchronization Channel (CSC) 820. This logical channel contains information similar to the DSC 825 (i.e. as discussed for DSC 235 of FIG. 2. However, the CSC 820 is broadcast by the BS rather than as a shared broadcast responsibility of IEEE 802.16m ad hoc capable nodes that was used for the DSC 825. As an alternative to the CSC 820, the RMC pointer information element 810 could be part of the IEEE 802.16e MAP contained as an information element of the MAP 815, thus eliminating the CSC 820.

The DSC 825, in addition to the description of the DSC 235 of FIG. 2, also contains the content of the RMC pointer information element 810. This is necessary to re-broadcast the RMC pointer information 810 to the nodes that are out of coverage with the BS.

Figure 9:
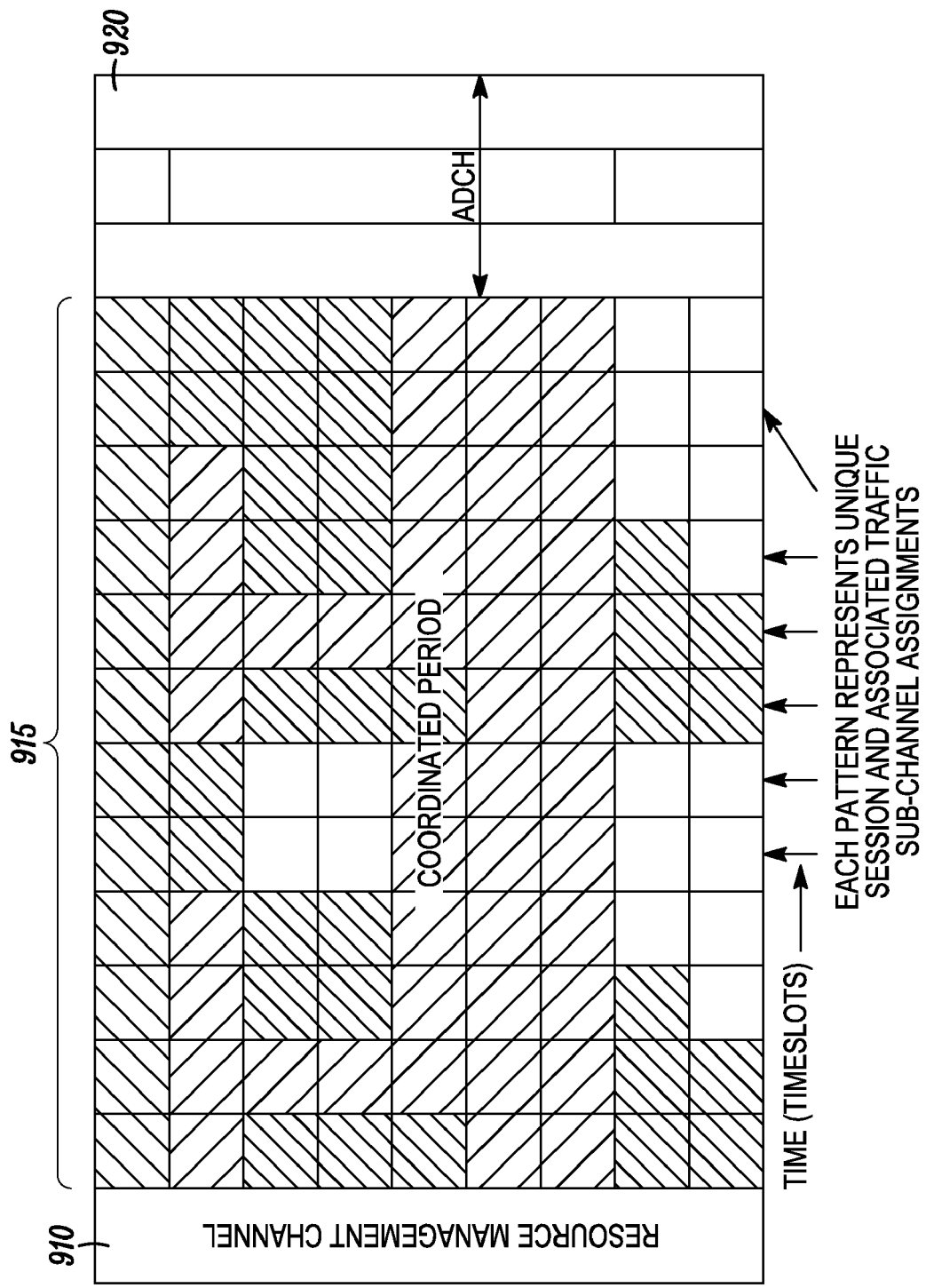
FIG. 9 illustrates a portion of the frame structure of FIG. 8 in accordance with some embodiments.

The optional Ad Hoc Data Channel 830 of the primary channel remains optional for mobile multi-hop/mesh networking for direct link or mesh peer-to-peer communication sessions where the resources are allocated from the primary channel Referring to FIG. 9, a Resource Management Channel (RMC) 910 is a logical channel similar to the IEEE 802.16e MAP in the primary channel in the sense that it provides grants for resources for IEEE 802.16m ad hoc capable nodes allocated from the alternate band.

The Coordinated Period 915 contains the uplink, downlink and multi-hop mesh resources that are allocated to all IEEE 802.16m capable nodes that are within the service range of the BS (e.g. single hop coverage).

Resources for a connection initiated by a node inside the service range of the BS to a node outside the service range of the BS could be allocated from the Coordinated Period 915. The initiating node requests resources from the BS in the normal way. After the BS allocates resources in the RMC 910 via the RMC pointer 810, the initiating node could relay the resource grant information from either the UL or DL of the primary band or the Ad Hoc Data Channel (ADCH) 920 of the alternate band. The grant-relaying procedure could be similar to an RTS-CTS exchange. The motivation for this is efficient resource allocation, avoiding unnecessary full-band allocations when allocations are base station-managed rather than managed by mobile stations. The reverse connection, however, must be in the Ad Hoc Data Channel 920.

The Ad Hoc Data Channel 920 contains multi-hop mesh resources that are allocated to all IEEE 802.16m capable nodes that are outside of the service range of the BS for direct link or mesh connections. These resources are negotiated for on the UAC 835 of the primary channel, although a UAC 835 could be established within the alternate band, for example as part of the RMC or as part of the Coordinated Period 915, or as part of the ADCH 920, or as a unique logical channel that replaces part of one of these fields 910, 915, or 920.

The methods for system operation are very similar to that already described relative to a system with only a primary channel. As described previously herein, the only difference is related to the initial resource allocation from the alternate band. Again, when the BS chooses to allocate resources from the alternate band to a new IEEE 802.16m ad hoc capable node, the BS will provide a downlink resource grant in the IEEE 802.16e MAP that points to the RMC pointer information element. The RMC pointer information element will contain parameters that describe the alternate band such as the frequency, bandwidth, time offset to the next frame that starts with the RMC, and other usage parameters. The node will then turn on its second transceiver that manages the alternate band prior to the start of the next frame containing the RMC. Thereafter, all resource grants for this IEEE 802.16m ad hoc capable node will be found in the alternate band RMC.

Figure 10:
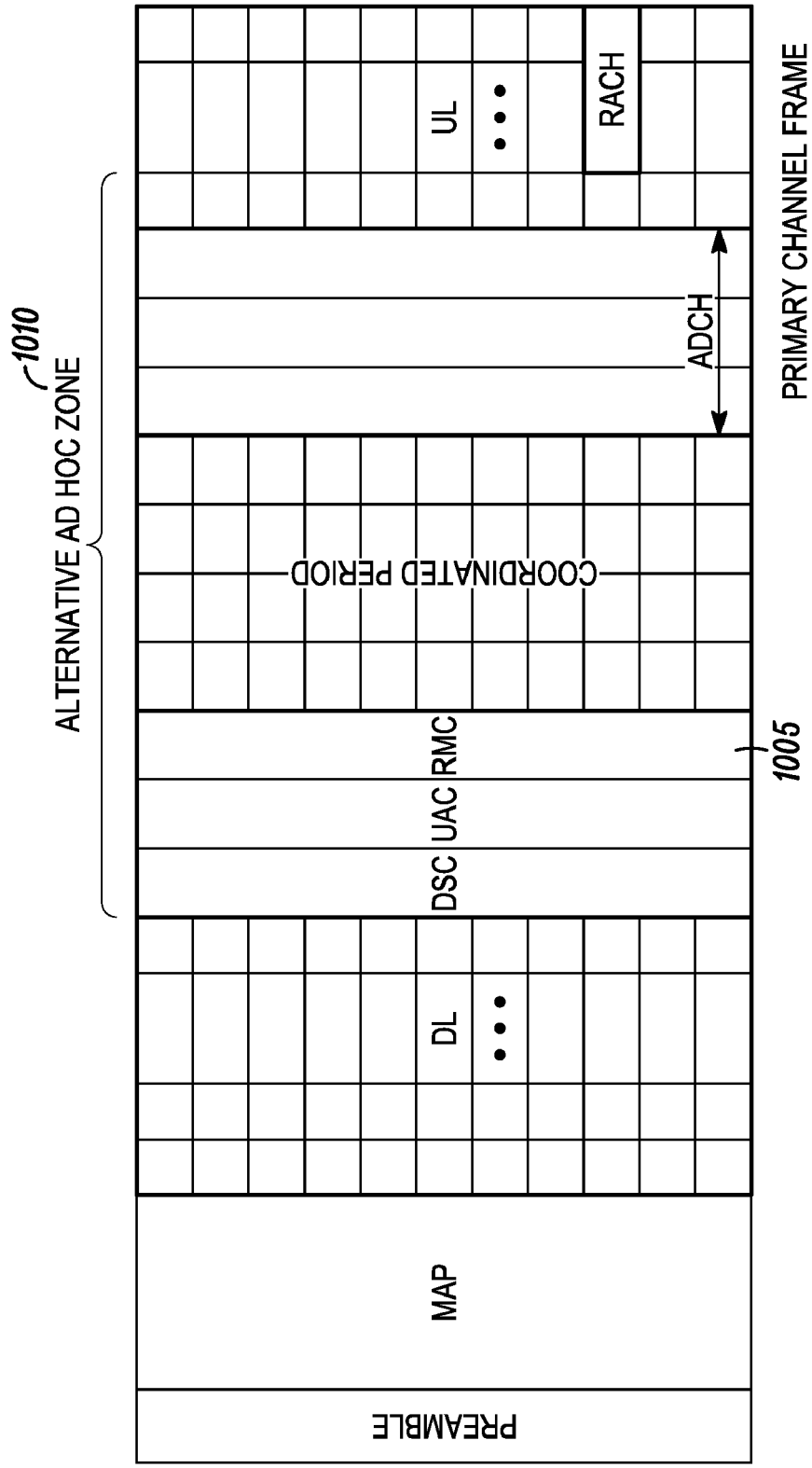
FIG. 10 illustrates an alternative frame structure in accordance with some embodiments.

The secondary channel frame formats described above support direct link and mesh connections with IEEE 802.16m ad hoc capable nodes. An alternative to the proposed frame format would include an in-band enhanced PHY and resource manager channel 1005 to incorporate the alternate band frame into the Ad Hoc Zone 1010 of the primary band. FIG. 10 illustrates this alternative frame format 1000. All logical channels within this alternative Ad Hoc Zone 1010 are functionally the same as described previously. This alternative frame format would only be for IEEE 802.16m ad hoc capable nodes.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing communication capability between a plurality of nodes comprising 802.16e nodes and 802.16m ad hoc capable nodes, the method comprising:
   providing an IEEE 802.16m frame structure having at least an uplink portion, a downlink portion, and an ad hoc zone for communication among the plurality of nodes; and
   communicating among the plurality of nodes including at least one of:
      synchronizing out of coverage nodes using at least one synchronization channel of the ad hoc zone,
      performing peer-to-peer communications between the plurality of nodes using at least one access channel of the ad hoc zone, and
      exchanging data during data sessions between the plurality of nodes using at least one ad hoc relay data/traffic channel of the ad hoc zone.

2. A method as claimed in claim 1, wherein the communication among the plurality of nodes further includes:
   permitting routing and resource negotiations between the ad hoc capable nodes by enabling the access channel in the ad hoc zone.

3. A method as claimed in claim 1, wherein the communication among the plurality of nodes further includes:
   negotiating resources of the ad hoc relay traffic/data channel between one or more peer nodes of the plurality of nodes based on local measurements of the ad hoc relay traffic/data channel.

4. A method as claimed in claim 1, wherein the ad hoc network further comprises a base station, the method further comprising:
   allocating resources of the ad hoc relay traffic/data channel based upon base station selection.

5. A method as claimed in claim 1, wherein:
   the synchronization channel, the access channel, and the ad hoc relay data/traffic channel are each allocated within a primary frequency band.

6. A method as claimed in claim 1, wherein:
   the synchronization channel and the access channel are each allocated within a primary frequency band; and
   the ad hoc relay data/traffic channel is allocated within an alternate frequency band.

7. A method as claimed in claim 1, wherein the IEEE 802.16m frame structure further comprises:
   a control channel information element, wherein the control channel information element comprises a logical channel providing a redirection to utilize an alternate frequency band.

8. A method as claimed in claim 7, wherein the alternate frequency band comprises a spectrum selected from a group comprising: a licensed spectrum, an unlicensed spectrum, and an opportunistic spectrum.

9. A method as claimed in claim 1, wherein the synchronization channel contains one or more parameters selected from a group comprising: parameters to support network synchronization paging channel elements, a paging group identifier, a network identifier, state information, Ad Hoc Data Channel descriptors, a size of the Ad Hoc Zone, a periodicity of the Ad Hoc Zone, a size of Ad Hoc channels, and a periodicity of Ad Hoc channels.

10. A method as claimed in claim 1, wherein the access channel provides communications of one or more messages selected from a group of messages comprising a broadcast message, a multicast message, and a unicast message.

11. A method as claimed in claim 1, further comprising:
    providing simultaneous access to the access channel.

12. A method as claimed in claim 1, wherein the access channel comprises:
    a first portion access channel for communicating routing messages; and
    a second portion access channel for communicating direct link resource negotiation messages.

13. A method as claimed in claim 1, further comprising:
    communicating a change in a pattern of the synchronization channel, the access channel, and the ad hoc relay data/traffic channel of the ad hoc zone in a synchronization channel of a change message.

* * * * *

UNITED STATES PATENT AND TRADEMARK OFFICE
CERTIFICATE OF CORRECTION

| | | |
|---|---|---|
| PATENT NO. | : 8,068,454 B2 | Page 1 of 1 |
| APPLICATION NO. | : 11/936513 | |
| DATED | : November 29, 2011 | |
| INVENTOR(S) | : Bonta et al. | |

It is certified that error appears in the above-identified patent and that said Letters Patent is hereby corrected as shown below:

In Fig. 4, Sheet 5 of 11, for Tag "422", in Line 1, delete "REPETION" and insert -- REPETITION --, therefor.

In Fig. 4, Sheet 5 of 11, for Tag "422", in Line 3, delete "CONFIRGURATION" and insert -- CONFIGURATION --, therefor.

In Column 2, Line 2, delete "USA)" and insert -- USA). --, therefor.

In Column 14, Line 65, delete "channel" and insert -- channel. --, therefor.

Signed and Sealed this
Fourth Day of December, 2012

David J. Kappos
*Director of the United States Patent and Trademark Office*